United States Patent [19]
Chalmers et al.

[11] 3,759,926
[45] Sept. 18, 1973

[54] PIPERIDINE DERIVATIVES AS STABILIZERS

[75] Inventors: Alexander Michael Chalmers, Cheadle Hulme; Donald Richard Randell, Stockport, both of England

[73] Assignee: Ciba-Geigy Corporation, Ardsley, N.Y.

[22] Filed: June 9, 1971

[21] Appl. No.: 151,511

[30] Foreign Application Priority Data
June 10, 1970 Great Britain................... 28,063/70

[52] U.S. Cl............... 260/293.9, 252/386, 252/403, 260/45.8 N, 260/293.62, 260/293.66, 260/293.84
[51] Int. Cl............................................. C07d 29/16
[58] Field of Search.................... 260/293.9, 293.62, 260/293.84

[56] References Cited
UNITED STATES PATENTS

| | | | |
|---|---|---|---|
| 2,706,194 | 4/1955 | Morris et al. ........................ | 260/247 |
| 3,334,103 | 8/1967 | Feldman et al. ..................... | 260/290 |
| 3,502,692 | 3/1970 | Feldman et al. .................. | 260/326.3 |
| 3,665,001 | 5/1972 | Valint .............................. | 260/239 A |

*Primary Examiner*—Henry R. Jiles
*Assistant Examiner*—G. Thomas Todd
*Attorney*—Karl F. Jorda and Nestor W. Shust

[57] ABSTRACT

New 4-Phosphinyl-4-hydroxypiperidines are useful as stabilizers for organic materials. They are prepared by reacting a 4-keto-piperidine with a phosphite.

8 Claims, No Drawings

PIPERIDINE DERIVATIVES AS STABILIZERS

DETAILED DISCLOSURE

The present invention relates to new chemical compounds and in particular to new nitroxides having value as light and heat stabilisers in organic material.

The first disclosure of a stable nitroxide derived from a hindered amine, namely triacetonamine nitroxide having the formula:-

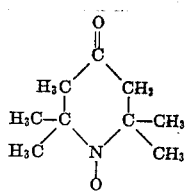

was by Lebedov, Khidekel and Razuvaev [Doklady Akad. Nauk. USSR, 140, 1327 (1961)].

Subsequently other publications have described the use of triacetonamine nitroxide and derivatives thereof and other closely related nitroxides as polymerisation inhibitors, anti-knock agents in fuels, antioxidants for rubber and as light stabilisers for polyolefines.

We have now found that a certain group of new piperidine derivatives having an hydroxyphosphonate group in the 4-position of the piperidine nucleus, provides extremely effective light and heat stabilisers for polyolefines and a range of other organic materials.

According to the present invention, there is provided a piperidine derivative having the formula:-

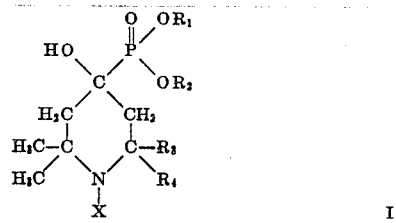

wherein X represents the radical O, H, OH, NO, alkyl, having 1 to 4 carbon atoms, cyanomethyl, cyanoethyl, alkoxyalkyl having from 2 to 4 carbon atoms, alkenyl having from 3 to 4 carbon atoms or hydroxyalkyl having from 1 to 4 carbon atoms, or aralkyl having from 7 to 12 carbon atoms; $R_1$ and $R_2$ are the same or different and each represents a hydrocarbyl group having 1 to 20 carbon atoms; and $R_3$ and $R_4$ are the same or different and each represents an alkyl group having from 1 to 20 carbon atoms, preferably $R_3$ and $R_4$ are each methyl, or together $R_3$ and $R_4$ from a cycloalkyl group having from 5 to 12 carbon atoms and acid salts thereof.

When X is alkyl having 1 to 4 carbon atoms preferred examples are methyl and ethyl groups. Examples of preferred alkoxyalkyl groups are methoxy-methyl and ethoxy-methyl and preferred hydroxyalkyl groups are hydroxy-methyl and hydroxy-ethyl.

When X is an aralkyl group it is preferably a benzyl or α-methyl- or α,α-dimethyl benzyl group. Most preferably, X is H, O or methyl.

Examples of preferred hydrocarbyl groups within the definition of $R_1$ and $R_2$ are alkyl, cycloalkyl, alkenyl, aryl, alkaryl and aralkyl groups each optionally further substituted with one or more halogen, preferably chlorine or bromine atoms When $R_1$ and $R_2$ are alkyl groups, they advantageously contain from 1 to 12 carbon atoms in the alkyl chain and may be methyl, ethyl, n-propyl, isopropyl, n-butyl, iso-butyl, n-hexyl, n-octyl or n-dodecyl groups. An example of a halogen substituted alkyl group is chloromethyl. Preferred cycloalkyl groups are those having from 5 to 12 carbon atoms in the cycloalkyl ring such as cyclopentyl and cyclododecyl groups, and especially the cyclohexyl group.

When $R_1$ and $R_2$ are alkenyl groups, these groups preferably contain from 2 to 12 carbon atoms per molecule and may be vinyl, α- or β-methylvinyl, allyl or methallyl groups. Preferred aryl groups have from 6 to 10 carbon atoms per molecule, and are especially phenyl and naphthyl groups; preferred alkaryl groups are those having from 7 to 18 carbon atoms per molecule. Preferred alkaryl groups which may be represented by $R_1$ and $R_2$ include especially, methylphenyl, t-butylphenyl and p-dodecylphenyl groups. Aralkyl groups which may be represented by $R_1$ and $R_2$ have, preferably, from 7 to 12 carbon atoms per molecule and include benzyl, α-methylbenzyl and α, α-dimethylbenzyl groups.

When $R_3$ and $R_4$ are alkyl groups they are each advantageously a methyl group. Alternatively, $R_3$ and $R_4$ may, together with the piperidine ring carbon atom to which they are attached, form a cycloalkyl ring having from 5 to 12 carbon atoms in the ring. Examples of such cycloalkyl groups include those having the formulae:

Salts of the piperidine derivatives (i) are a further important embodiment of this application. Examples of salts of piperidine derivatives (I) that can be used according to the invention include salts of an inorganic acid such as phosphates, carbonates, sulphates, chlorides and the like as well as organic acid salts such as citrates, acetates, stearates, maleates, oxalates and benzoates.

Specific examples of preferred compounds of formula I include:

4-dimethoxyphospinyl-4-hydroxy-2,2,6,6-tetramethyl piperidine, 4-diethoxyphosphinyl-4-hydroxy-2,2,6,6-tetramethyl piperidine, 4-di-n-propoxyphosphinyl-4-hydroxy-2,2,6,6-tetramethyl piperidine, 4-di-isopropoxyphosphinyl-4-hydroxy-2,2,6,6-tetramethyl piperidine, 4-di-n-butoxyphosphinyl-4-hydroxy-2,2,6,6-tetramethyl piperidine, 4-di-isobutoxyphosphinyl-4-hydroxy-2,2,6,6-tetramethyl piperidine, 4-di-n-hexoxyphosphinyl-4-hydroxy-2,2,6,6-tetramethyl piperidine, 4-di-n-octoxyphosphinyl-4-hydroxy-2,2,6,6-tetramethyl piperidine, 4-di-n-decoxyphosphinyl-4-hydroxy-2,2,6,6-tetramethyl piperidine, 4-di-n-dodecoxyphosphinyl-4-hydroxy-2,2,6,6-tetramethyl piperidine, 4-di-n-octadecoxyphosphinyl-4-hydroxy-2,2,6,6-tetramethyl piperidine, 4-di-n-eicosoxyphosphinyl-4-hydroxy-2,2,6,6-tetramethyl piperidine, 4-di-cyclohexoxyphosphinyl-4-hydroxy-2,2,6,6-tetramethyl piperidine, 4-di-phenoxyphosphinyl-4-hydroxy-2,2,6,6-tetramethyl piperidine, 4-di-benzyloxyphosphinyl-4-hydroxy-2,2,6,6-tetramethyl piperidine, 4-diethoxyphosphinyl-4-hydroxy-2,2,6-trimethyl-6-ethyl piperidine, 4-di-n-butoxyphosphinyl-4-hydroxy-2,2,6-trimethyl-6-ethyl piperidine, 4-di-n-octoxyphosphinyl-4-hydroxy-2,2,6-trimethyl-6-ethyl piperidine, 4-di-cyclohexoxyphosphinyl-4-hydroxy-2,2,6-trimethyl-6-ethyl piperidine, 4-di-benzyloxyphosphinyl-4-hydroxy-2,2,6-trimethyl-6-ethyl piperidine, 4-diethoxyphosphinyl-4-hydroxy-2,2,6-trimethyl-6-n-hexyl piperidine, 4-dicyclohexoxyphosphinyl-4-hydroxy-2,2,6-trimethyl-6-hexyl piperidine, 4-diethoxylphosphinyl-4-hydroxy-2,2-dimethyl-6,6-di-isobutyl piperidine, 4-dicyclohexoxyphosphinyl-4-hydroxy-2,2-dimethyl-6,6-di-isobutyl piperidine, 1-aza-4-diethoxyphosphinyl-4-hydroxy-2,2-dimethyl-spiro [5,5] undecane, 1-aza-4-dicyclohexoxyphosphinyl-4-hydroxy-2,2,dimethyl spiro [5,5] undecane, and the respective piperidine-1-oxyl, 1-methyl piperidine, 1-nitroso piperidine, 1-benzyl piperidine, 1-allyl piperidine, 1-methoxymethyl piperidine, 1-β-hydroxyethyl piperidine, 1-hydroxy piperidine and 1-cyanoethyl piperidine derivatives.

The piperidine compounds of formula I are produced by reacting a compound of formula II:

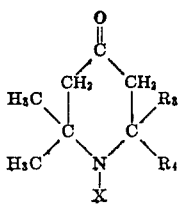

II wherein X, $R_3$ and $R_4$ have their previous significance, with a phosphite having the formula III:-

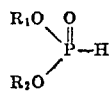

III wherein $R_1$ and $R_2$ have their previous significance.

The reaction proceeds smoothly by reacting substantially equimolar proportions of compounds II and III at ambient temperatures of from 15° to 25° C but higher reaction temperatures up to the reflux temperature of the reaction mixture may be employed if desired. Optionally, an inert organic solvent may be present. In order to increase the rate of reaction, it is advantageous to have present alkaline material, the amount varying between catalytic amounts and 5 moles per mole of phosphite. Suitable alkaline materials include, by way of example, alkali metal alkoxides having from 1 to 4 carbon atoms in the alkyl chain, for instance sodium methoxide and potassium ethoxide, and mono-, di- and tri-alkylamines having from 1 to 4 carbon atoms in the alkyl chain, for instance t-butylamine and di- and tri-ethylamine.

Piperidine 1-oxyl compounds of formula I in which X is O may be prepared by reacting the corresponding piperidine or 1-hydroxy piperidine compounds of formula I with an oxygen-releasing oxidising agent. Suitable oxygen-releasing oxidising agents include, for example, hydrogen peroxide, percarboxylic acids and chlorinated derivatives thereof such as perbenzoic acid and m-chloroperbenzoic acid. Compounds of formula I where X is lower alkyl, aralkyl or cyanoethyl or cyanomethyl, allyl, nitroso, hydroxyalkyl or alkoxyalkyl may be prepared by reaction of the corresponding substituted piperidine with the corresponding alkyl or aralkyl halide acrylonitrile, formaldehyde/HCN, allyl halide, nitrous acid, alkyleneoxide or alcohol/formaldehyde.

Further processes for the production of 1-hydroxy compounds of formula I comprise hydrogenating the corresponding piperidine-1-oxyl compound of formula I wherein X is O or reacting the latter with a hydrogen halide.

The hydrogenation reaction is preferably effected under moderate temperature and pressure, that is at a temperature not exceeding 50° C and at a pressure not exceeding 5 atmospheres until substantially one mole of hydrogen/mole of compound of formula I has been consumed. Advantageously a minor proportion of catalyst is employed during the hydrogenation process. Examples of suitable catalysts include metals of the group consisting of nickel, platinum, palladium, ruthenium and rhodium, the metals being employed either in metallic form or mounted on a suitable carrier, such as asbestos, calcium carbonate or charcoal.

When the piperidine-1-oxyl compound is contacted with a hydrogen halide, the halide is desirably hydrogen chloride or hydrogen bromide and the reaction is advantageously effected using substantially equimolar proportions of the reactants.

The present invention still further provides a composition comprising a polymeric material, and a minor proportion of a compound having the formula I as hereinbefore defined.

Compounds of formula I have been found to impart to polyolefines an exceptionally high degree of stability towards deterioration normally induced by the effects of ultra-violet radiation and heat stabilisation, this light stability is achieved without affecting the colour properties of the treated polyolefine. The compounds of formula I provide effective light stabilisation of low- and high-density polyethylene and polypropylene as well as polymers of butene-1, pentene-1, 3-methylbutene-1, hexene-1, 4-methylpentene-1, 4-methylhexene-1, and 4,4-dimethylpentene-1 and co- and terpolymers of olefines, especially of ethylene or propylene.

Other organic materials susceptible to degradation by the effects of light and the properties of which are improved by the incorporation therein of a compound of formula I include natural and synthetic polymeric materials, for instance natural and synthetic rubbers, the latter include, for example, homo-, co- and terpolymers of acrylonitrile, butadiene and styrene.

Specific synthetic polymers include polyvinyl chloride and polyvinyl acetate as well as condensation polymers derived from ether, ester (ex carboxylic, sulphonic or carbonic acids), amide or, especially, urethane groupings. These polymers can, for instance, form the basis of surface coating media such as paints and lacquers having an oil or resin, for instance an alkyl or polyamide resin base.

The compound of formula I may be incorporated into the polymeric material by any of the known techniques for compounding additives with a polymer. For example, the compound of formula I and the polymer may be compounded in an internal mixer. Alternatively, the compound of formula I may be added as a solution or slurry in a suitable solvent or dispersant, for instance an inert organic solvent such as methanol, ethanol or acetone to powdered polymer and the whole mixed intimately in a mixer, and the solvent subsequently removed. As a further possibility the compound of formula I may be added to the polymer during the preparation of the latter, for instance at the latex stage of polymer production, to provide pre-stabilized polymer material.

The amount of the compound of formula I which is incorporated into the organic material in order to achieve maximal protection against degradation by light varies according to the properties of the organic material treated and according to the severity of the light radiation and of the length of exposure. However, for most purposes it is sufficient to use an amount of the compound of formula I within the range of from 0.01 percent to 5 percent by weight, more preferably within the range of from 0.1 percent to 2 percent by weight based on the weight of untreated organic material.

Optionally, the composition of the invention may contain further additives, especially those used in polyolefine formulations, such as antioxidants, further light stabilizers, metal complexants/deactivators, pigments, anti-slipping and anti-static agents, fillers, dyes and glass or other fibres.

Examples of suitable antioxidants are those of the hindered phenol type such as 2,6-di-tertiarybutyl-p-cresol, 4,4'-bis (2,6-di-t-butylphenol),4,4'-bis(2,6-diisopropylphenol), 2,4,6-triisopropylphenol, 2,2'-thio-bis(4-methyl-6-tertiarybutyl-phenol), octadecyl 3[3',5'-di-t-butyl-4'-hydroxyphenyl] propionate and tetrakis [methylene-3(3', 5'-di-t-butyl-4'-hydroxyphenyl) propionate] methane; esters of thio-dipropionic acid, for example dilauryl thiodipropionae; alkyl, aryl or alkaryl phosphites such as triphenyl phosphite, trinonyl phosphite and diphenyldecyl phosphite; and combinations of these antioxidants.

Further light stabilisers include those of the substituted benzotriazole class such as 2-(2'-hydroxy-5'-methylphenyl)benzotriazole, 2-(2'-hydroxy-3',5'-di-t-butylphenyl)-5-chlorobenzotriazole; those of the hydroxybenzophenone type; hindered phenols such as 2', 4'-di-t-butylphenyl-3,5-di-t-butyl-4-hydroxybenzoate and the stabilisers described in our copending British Patent Application No. 18,090/70, and suitable metal complexants/deactivators include salicylidenepropylene diamine, 5,5'-methylene-bis-benzotriazole, salts of salicrylaminoguanidine and nickel compounds, for example nickel complexes of 2,2'-thiobis-(4-tertiary octylphenol), such as the 1:1- and 1:2-complex, optionally with other ligands such as n-butylamine, nickel complexes of bis-(4-tertiary octylphenyl)-sulphone such as the 2:1-complex, optionally with other ligands such as 2-ethyl caproic, nickel dibutyl dithiocarbamate, nickel salts of 4-hydroxy-3,5-di-tertiary butylbenzyl phosphonic acid mono alkyl esters, such as the methyl-, ethyl- or butyl esters, the nickel complex of 2-hydroxy-4-methyl-phenyl-undecyl ketone oxime.

As with the compound of formula I, any further additive is advantageously employed in a proportion within the range of from 0.01 percent to 5 percent by weight, based on the weight of untreated organic material.

In combination with an antioxidant suitable for use in inhibiting oxidative deterioration of polyolefines, for instance those of the hindered phenol type, the compounds of formula I provide extremely effective all round stabilising packages for polyolefines, especially polypropylene. They may also find use as anti-knock additives for gasolines and they also show biological activity.

The following Examples further illustrate the present invention. Parts and percentages show therein are by weight unless otherwise stated.

EXAMPLE 1

17.2 parts of triacetonamine (obtained by reaction of phorone and ammonia) were treated with 30.6 parts of diethylphosphite and 9 parts of t-butylamine. After allowing the mixture to stand for 24 hours at 20° C., the solid precipitate was removed by filtration, washed and dried to provide 24.2 parts of 4-di-ethoxyphosphinyl-4-hydroxy-2,2,6,6-tetramethylpiperidine as colourless prisms. By treating the filtrate with dilute aqueous sodium bicarbonate solution and then extracting the alkaline solution with chloroform, a further 3.3 parts of the desired product were obtained. Recrystallisation of the product from ethyl acetate gave pure material having melting-point 117° to 119° C. and the following elemental analysis by weight:

|  | Required (for $C_{13}H_{28}NO_4P$) | Found |
| --- | --- | --- |
| carbon | 53.22% | 53.48% |
| hydrogen | 9.62% | 9.92% |
| nitrogen | 4.78% | 4.71% |
| phosphorus | 10.56% | 10.37% |

EXAMPLE 2

A mixture of 10 parts of 4-keto-2,2,6,6-tetramethylpiperidine-1-oxyl (obtained by oxidation of triacetonamine using hydrogen peroxide and tungstophosphoric acid catalyst), 16.4 parts of diethyl phosphite, 8.6 parts of t-butylamine and 40 parts of ethanol was heated under reflux conditions for 10 hours. Evaporation of the solvent and volatile amine left a red oil which, on recrystallisation from ethyl acetate, afforded 9 parts of a red solid, 4-diethoxyphosphinyl- 4-hydroxy-2,2,6,6-tetramethylpiperidine-1-oxyl having melting-point 127° to 129° C. and the following elemental analysis by weight:

|  | Required (for $C_{13}H_{27}NO_5P$) | Found |
| --- | --- | --- |
| carbon | 50.63% | 50.65% |
| hydrogen | 8.83% | 8.85% |
| nitrogen | 4.54% | 4.69% |
| phosphorus | 10.05% | 10.28% |

EXAMPLE 3

20 parts of triacetonamine were treated with 66.4 parts of dicyclohexyl phosphite and 10.3 parts of t-butylamine and this mixture was allowed to stand at 20°

C. for 24 hours. A further 20 parts of t-butylamine were then added to the mixture and this further mixture allowed to stand at 20° C. for 24 hours. The mixture was diluted with diethyl ether, dilute sulphuric acid added to the ether solution and the aqueous phase so formed washed with further ether. The aqueous phase was then rendered alkaline, extracted with ether, the ether extract washed with brine and dried over anhydrous magnesium sulphate. The ether solvent was then removed by evaporation to leave 31 parts of 4-dicyclohexylphosphinyl-4-hydroxy-2,2,6,6-tetramethyl piperidine which on crystallisation from ethyl acetate gave pure material having melting-point 135.5° to 136.5° C. and the following elemental analysis by weight:

strom units. The samples were rotated concentrically within the bank of lamps so that the radiation therefrom was uniformly distributed over the moulded sheet.

The exposed sample was examined periodically and bent through 180°, and the time at which they snapped due to emibrittlement was noted in each case.

Similar tests were carried out on polypropylene samples containing no stabiliser, 2-(2'-hydroxy-3', 5'-di-t-butylphenyl)-5-chlorobenzotriazole or one of the other compounds of the invention. Certain of these tests were also repeated using in addition to 0.15 percent by weight of the test compound, the same proportion of tetrakis [methylene-3(3',5'-di-t-butyl-4'-hydroxyphenyl propionate] methane. The results achieved are set out in the following Table.

TABLE

| Example | Test compound | Time to failure in light test (hrs.) | |
|---|---|---|---|
| | | 0.15% of test compound | 0.15% of test compound [1] |
| | None | 124 | |
| | 2-(2'-hydroxy-3',5'-di-t-butylphenyl)5-chlorobenzotriazole | 251 | 289 |
| 4 | 4-diethoxyphosphinyl-4-hydroxy-2,2,6,6-tetramethylpiperidine | 285 | 273 |
| 5 | 4-diethoxyphosphinyl-4-hydroxy-2,2,6,6-tetramethylpiperidine-1-oxyl | 480 | 430 |
| 6 | 4-dicyclohexoxyphosphinyl-4-hydroxy-2,2,6,6-tetramethylpiperidine | 634 | |
| 7 | 4-di-n-butoxyphosphinyl-4-hydroxy-2,2,6,6-tetramethylpiperidine-1-oxyl | 506 | |
| 8 | 1-hydroxy-4-diethoxyphosphinyl-4-hydroxy-2,2,6,6-tetramethylpiperidine | 506 | |
| 9 | 4-diethoxyphosphinyl-4-hydroxy-1,2,2,6,6-pentamethylpiperidine | 319 | |
| 10 | 4-dibenzyloxyphosphinyl-4-hydroxy-2,2,6,6-tetramethylpiperidine | 255 | |
| 11 | 4-diethoxyphosphinyl-4-hydroxy-1-nitroso-2,2,6,6-tetramethylpiperidine | 353 | |

[1] Plus 0.15% tetrakis [methylene-3 (3',5'-di-t-butyl-4'-hydroxyphenyl propionate] methane.

NOTE.—These results illustrate the substantial superiority as light stabilisers for polypropylene under standard conditions of compounds of the invention compared with established stabilisers.

| | Required (for $C_{21}H_{40}NO_4P$) | Found |
|---|---|---|
| carbon | 62.82% | 62.82% |
| hydrogen | 10.04% | 10.24% |
| nitrogen | 3.49% | 3.54% |
| phosphorus | 7.71% | 7.79% |

EXAMPLES 4 TO 11

A 0.15 percent weight/volume solution of the product of Example 1 in acetone was made up and 40 parts by volume of this solution was added to 40 parts by weight of powdered polypropylene which was substantially free from stabilising additives. A further 60 parts by volume of acetone was added to form a slurry and the solvent was then removed by evaporation in a rotary evaporator heated by a boiling water bath, the last traces of solvent being removed by passing a slow stream of nitrogen therethrough.

14 parts by weight of the dried powder were weighed into a mould measuring 6 × 6 × 0.015 inch. The mould and polishing plate were then heated in the press under constant pressure for 5 minutes. A pressure of 20 tons per square inch was applied for one minute, cooling was commenced and pressure increase so that when the temperature reached 150° C., the pressure was 80 tons per square inch. Cooling was continued until the temperature of the mould reached 50° C. and the mould was released from the press.

The moulded sheet so obtained was exposed to light irradiation in a fademeter device consisting of a circular bank of 28 alternate sunlight and blacklight lamps. The sunlight lamps were 2 feet long 20-watt fluorescent lamps and were characterised by having a peak emission of 3,100 Angstrom units and the blacklight lamps were 2 feet long 40-watt ultra-violet lamps and were characterised by having a peak emission of 3,500 Ang- The procedure described under Examples 4 to 11 was repeated but the polypropylene also contained 2 percent of titanium dioxide as pigment. The results of tests in the pigmented polypropylene are given in the Table below.

TABLE

| Example | Test Compound | Time to failure in Light Test (Hrs) using 0.15% of test compound |
|---|---|---|
| — | 2-(2'-hydroxy-3',5'-di-t-butyl-phenyl)-5-chlorobenzotriazole | 520 |
| — | dilauryl thiodipropionate | 331 |
| 12 | 4-diethoxyphosphinyl-4-hydroxy-2,2,6,6-tetramethylpiperidine-1-oxyl | >793 |

EXAMPLE 13

A mixture of 5 parts 4-keto-2,2,6,6-tetramethyl-piperidine-1-oxyl, 11.6 parts di-n-butylphosphite and 2.2 parts of t-butylamine was allowed to stand overnight at 25° C. Evaporation followed by standing yielded 10.1 parts of a red crystalline solid 4-di-n-butoxyphosphinyl-4-hydroxy-2,2,6,6-tetramethyl-piperidine-1-oxyl which could be crystallised from ethyl acetate. This material had a melting point of 70°–71.5° C. and gave the following elemental analysis by weight:

| | Required for $C_{17}H_{35}NO_5P$ | Found |
|---|---|---|
| carbon | 56.02% | 56.61% |
| hydrogen | 9.68% | 9.81% |
| nitrogen | 3.85% | 3.70% |
| phosphorus | 8.50% | 8.26% |

EXAMPLE 14

A mixture of 3.2 parts 4-diethoxyphosphinyl-4-hydroxy-2,2,6,6-tetramethyl piperidine, 3.0 parts of methyl iodide and 10 parts of isopropyl alcohol was allowed to stand overnight at 25° C. Evaporation was followed by saturated sodium bicarbonate addition and ether extraction. Brine washing, drying and evaporation of the organic phase yielded 1.1 parts of a colourless solid 4-diethoxyphosphinyl-4-hydroxy-1,2,2,6,6-pentamethylpiperidine which on recrystallisation from ethyl acetate gave crystals having melting point 131° to 133° C and the following elemental analysis by weight:

|  | Required $C_{14}H_{30}NO_4P$ | Found |
|---|---|---|
| carbon | 54.75 | 54.97% |
| hydrogen | 9.77 | 9.83% |
| nitrogen | 4.56 | 4.74% |
| phosphorus | 10.08 | 9.81% |

EXAMPLE 15

8 parts of triacetonamine were treated with 27.1 parts of dibenzyl phosphite and 2 parts of triethylamine and this mixture allowed to stand at 20° C for 24 hours.

Treatment as in Example 3 afforded 14.4 parts of an oil which solidified on standing and could be recrystallised from petroleum ether/ethyl acetate. The pure material 4-dibenzyl-oxyphosphinyl-4-hydroxy-2,2,6,6-tetramethylpiperidine had melting point 90 to 92°C and the following elemental analysis by weight:

|  | Required for $C_{23}H_{32}NO_4P$ | Found |
|---|---|---|
| carbon | 66.19 | 66.36% |
| hydrogen | 7.72 | 7.96% |
| nitrogen | 3.35 | 3.65% |
| phosphorus | 7.42 | 7.66% |

EXAMPLE 16

1 part of 4-diethoxyphosphinyl-4-hydroxy-2,2,6,6-tetramethyl piperidine-1-oxyl were hydrogenated at a pressure not exceeding 5 atmospheres and a temperature not exceeding 50° C over a catalytic amount of 5 percent palladium/charcoal in 100 parts absolute ethanol. After several minutes no more hydrogen was absorbed and the solution was filtered and evaporated to yield 0.4 parts of a colourless solid 4-diethoxyphosphinyl-1,4-dihydroxy-2,2,6,6-tetramethylpiperidine which was recrystallised from acetone to yield pure material of melting point 157° to 158° C and having the following elemental analysis by weight:

|  | Required for $C_{13}H_{28}NO_5P$ | Found |
|---|---|---|
| carbon | 50.48 | 50.49% |
| hydrogen | 9.12 | 9.44% |
| nitrogen | 4.53 | 4.71% |
| phosphorus | 10.01 | 10.16% |

EXAMPLE 17

0.5 parts of 4-dimethoxyphosphinyl-4-hydroxy-2,2,6,6-tetramethyl piperidine-1-oxyl were hydrogenated as in Example 16 to yield 0.25 parts of 4-dimethoxyphosphinyl-1,4-dihyroxy-2,2,6,6-tetramethylpiperidine having melting point 166° to 167° crystallised from acetone, and having the following elemental analysis by weight:

|  | Required for $C_{11}H_{24}NO_5P$ | Found |
|---|---|---|
| carbon | 47.00 | 46.89% |
| hydrogen | 8.56 | 8.86% |
| nitrogen | 4.98 | 4.80% |
| phosphorus | 11.01 | 10.82% |

EXAMPLE 18

18.4 parts of 4-keto-1-nitroso-2,2,6,6-tetramethylpiperidine (obtained from triacetonamine hydrochloride salt and nitrous acid) were treated with 27.6 parts of diethyl-phosphite and 7.3 parts of t-butylamine. After allowing the mixture to stand for at least 24 hours at 20° C, the solution was evaporated in vacuo, diluted with ether and washed with dilute acid and brine. Drying and evaporation afforded 35 parts of 4-diethoxyphosphinyl-4-hydroxy-1-nitroso-2,2,6,6-tetramethylpiperidine as a pale yellow crystalline material. Recrystallisation from petroleum ether (60°–80° C) gave a melting point 96°–98° C and the following elemental analysis by weight:

|  | Required for $C_{13}H_{27}N_2O_5P$ | Found |
|---|---|---|
| carbon | 48.43% | 48.22% |
| hydrogen | 8.45% | 8.35% |
| nitrogen | 8.69% | 8.42% |
| phosphorus | 9.61% | 9.79% |

EXAMPLES 19 TO 21

0.15 percent (weight/volume) solutions of 4-diethoxyphosphinyl-4-hydroxy-2,2,6,6-tetramethyl piperidine-1-oxyl, 4-di-n-octoxy-phosphinyl-4-hydroxy-2,2,6,6-tetramethylpiperidine and 4-di-n-dodecoxyphosphinyl-4-hydroxy-2,2,6,6-tetramethylpiperidine respectively in acetone were made up. To each of these solutions were added 40 parts by weight of unstabilised polypropylene powder. A further 60 parts by volume of acetone were added to each mixture to form slurries which were hand mixed to ensure homogeneity. The solvent was then removed from each slurry by evaporation.

Samples of the respective dry powders were then placed in a mould (6.0 inch × 6.0 inch × 0.015 inch). The mould was then heated in a press under constant pressure for 5 minutes. A pressure of 20 tons/square inch was applied for 1 minute, cooling was commenced and pressure increased so that when the temperature reached 150° C., the pressure was 80 tons/square inch. Cooling was continued to 50° C., when the mould was removed from the press.

An oven ageing test was carried out using strips from the pressings (the strips being 6.0 × 1.0 inch) in an air circulating oven maintained at 150° C. The time taken for the test strip to fail by cracking on flexing the sample through 180° C. was noted.

The results achieved, including a control experiment and an experiment using 2-(2'-hydroxy-5'-methylphenyl) benzotriazole) are set out below:

| Example | Additive | Time to failure (hours) |
|---|---|---|
| — | No additive | 2 |
| — | 2-(2'-hydroxy-5'-methylphenyl) benzotriazole) | 2 |
| 19 | 4-diethoxyphosphinyl-4-hydroxy 2,2,6,6-tetramethylpiperidine-1-oxyl | 6 |
| 20 | 4-di-n-octoxyphosphinyl-4-hydroxy-2,2,6,6-tetramethylpiperidine | 4 |
| 21 | 4-di-n-dodecoxyphosphinyl-4-hydroxy-2,2,6,6-tetramethyl piperidine | 4 |

EXAMPLE 22

10 parts of triacetonamine were treated with 19.9 parts of dioctylphosphite and 3.3 parts of t-butylamine. The mixture was allowed to stand for 24 hours at 20° C and the volatile material removed by evaporation. Addition of dilute sulphuric acid was followed by washing with diethyl ether. The aqueous phase was carefully basified with aqueous sodium carbonate and extracted with diethyl ether. Drying with magnesium sulphate and evaporation of the solvent afforded 24 parts of 4- dioctoxyphosphinyl-4-hydroxy-2,2,6,6-tetramethylpiperidine. This material had the following elemental analysis by weight:

| | Required (for $C_{25}H_{52}NO_4P$) | Found |
|---|---|---|
| carbon | 65.03% | 64.77% |
| hydrogen | 11.35% | 11.04% |
| nitrogen | 3.03% | 2.83% |
| phosphorus | 6.71% | 6.66% |

EXAMPLE 23

4-didodecoxyphosphinyl-4-hydroxy-2,2,6,6-tetramethylpiperidine was prepared in a similar manner to Example 22 but using didodecyl phosphite instead of the dioctyl phosphite used in Example 22.

EXAMPLE 24

A mixture of 5 parts of 4-keto-2,2,6,6-tetramethylpiperidine-1-oxyl, 6.6 parts of dimethylphosphite and 2.2 parts of t-butylamine was allowed to stand for one hour at 25° C. A red crystalline solid was obtained by filtration which on recrystallisation from ethyl acetate afforded 5.5 parts of 4-dimethoxyphosphinyl-4-hydroxy-2,2,6,6-tetrametylpiperidine-1-oxyl. This material had a melting point of 173° to 175° C and gave the following elemental analysis by weight:

| | Required (for $C_{11}H_{23}NO_5P$) | Found |
|---|---|---|
| carbon | 47.12% | 47.20% |
| hydrogen | 8.27% | 8.39% |
| nitrogen | 5.00% | 4.94% |
| phosphorus | 11.05% | 10.85% |

EXAMPLE 25

15 parts of 4-diethoxyphosphinyl-4-hydroxy-2,2,6,6-tetramethyl piperidine were dissolved in 250 parts of dry diethyl ether at 0° C. Hydrogen chloride gas was bubbled into the solution for a short period and a gum-like solid was separated by filtration. Trituration with diethyl ether afforded 5 parts of 4-diethoxyphosphinyl-4-hydroxy-2,2,6,6-tetramethylpiperidine hydrochloride having a melting point of 232° C.

EXAMPLES 26 TO 28

The following composition was employed:
0.2 part light stabiliser under test
2 parts Irgastab BC 12 (a Ba/Cd laurate heat stabiliser)
100 parts Breon 111EP (polyvinyl chloride)
54 parts Reomol D79P (di $C_{7-9}$ alphanyl phthalate)

The various compositions were subjected to light exposure in the fademeter device described in Examples 4 to 11 for 2560 hours and thereafter examined and compared with the above composition prepared without light stabiliser. The qualitative results are given below:

| Example | Light stabiliser | Appearance of PVC composition after exposure |
|---|---|---|
| — | None | Heavy brown speckling |
| 26 | 4-diethoxyphosphinyl-4-hydroxy-2,2,6,6-tetramethyl piperidine-1-oxyl | Light speckling |
| 27 | 4-di-n-butoxyphosphinyl-4-hydroxy-2,2,6,6-tetramethyl piperidine-1-oxyl | Very light speckling |

In a similar test on a composition made up as above but containing a non-commercial Ba/Cd laurate instead of Irgastab BC12 and with an exposure time of 844 hours the following observations were made:

| Example | Light Stabiliser | Appearance of PVC composition after exposure |
|---|---|---|
| — | None | Dark yellow |
| | Polygard (nonylated triphenyl phosphite | Light yellow |
| | Bisphenol A | Yellow |
| 28 | 4-diethoxyphosphinyl-4-hydroxy-2,2,6,6-tetramethyl piperidine-1-oxyl | Light yellow |

The effect of improving the light stability of polyvinyl chloride by compounds of the invention is demonstrated.

EXAMPLES 29 AND 30

The compositions described in Examples 26 and 27 were subjected to heating at 180° C. for times indicated below. The appearance of the specimens after the various times are recorded and compared with the composition with heat stabiliser but not containing a compound of the invention.

| Example | Additive | Appearance of PVC after heating at 180° C. for time indicated (in mins.) | | | | | | |
|---|---|---|---|---|---|---|---|---|
| | | 0 | 15 | 30 | 45 | 60 | 75 | 90 |
| | None | C | C | OW | LB | B | | |
| 29 | 4-diethoxyphosphinyl-4-hydroxy-2,2,6,6-tetramethylpiperidine-1-oxyl | C | C | OW | OW | YB | B | |
| 30 | 4-di-n-butoxyphosphinyl-4-hydroxy-2,2,6,6-tetramethylpiperidine-1-oxyl | C | C | C | C | C | YB | B |

C=clear, OW=off-white, YB=yellow brown, B=brown.

The results given above clearly indicate the effect of the the compounds of the invention in improving the heat stability of polyvinyl chloride.

EXAMPLE 31

The following composition was made up:-
100 parts weight of a styrene-butadiene rubber
2 parts weight stearic acid
5 parts weight zinc oxide
50 parts weight clay
2 parts weight sulphur
2 parts weight accelerators
1 part weight of 4-diethoxyphosphinyl-4-hydroxy-2,2,6,6-tetramethyl-piperidine-1-oxyl.

The formulation was compounded on a water-cooled mill using the following mixing sequence:
a masticate rubber for 3 minutes
b add zinc oxide, stearic acid and antioxidant under test
c add clay
d add accelerators and blend well
e add sulphur, cut and roll
f grind using six passes through a tight nip.

Vulcanisation was effected in a press at 152° C. and 70 pounds/square inch steam pressure. After vulcanisation, the polymer was stripped from the hot mould.

Ageing of the vulcanised strip was carried out according to British Standard 903: Part A19: 1956 method A, using type E dumbbells. Three dumb-bells containing the antioxidant under test were maintained in a glass cell at 70° C. and air was passed through the cell at a rate of 0.35 cubic feet per hour, the test being continued for 14 days.

At the end of this time, the samples were left at constant temperature and humidity for 24 hours prior to their tensile properties being determined in a tensometer. During tensile testing, the cross-head speed was 20 inches/minute and a 25 kg. load cell was used.

The results observed, including the results of a control experiment using no antioxidant additive are set out in the following Table:

| Example | Additive | Elongation at Break % | | |
|---------|----------|---------|--------|---------|
| | | Initial | Final% | change |
| — | None | 510 | 340 | −33.3 |
| 31 | 4-diethoxyphosphinyl-4-hydroxy-2,2,6,6-tetramethylpiperidine-1-oxyl | 563 | 410 | −27.2 |

What we claim is:

1. A piperidine derivative having the formula:

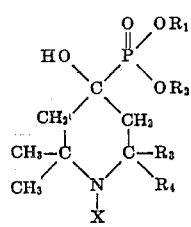

wherein X represents the radical O, H, OH, NO, alkyl, having 1 to 4 carbon atoms, alkoxyalkyl having from 2 to 4 carbon atoms, hydroxyalkyl having from 1 to 4 carbon atoms, cyanomethyl, cyanoethyl, alkenyl having 3 or 4 carbon atoms, benzyl, α-methylbenzyl or α,α-dimethylbenzyl; $R_1$ and $R_2$ are the same or different and each represents an alkyl group of from 1 to 12 carbon atoms, a halogen substituted alkyl group containing from 1 to 12 carbon atoms, a cycloalkyl group containing from 5 to 12 carbon atoms, an alkenyl group containing from 2 to 12 carbon atoms, a phenyl group, a naphthyl group, an alkyl substituted phenyl group, said alkyl group containing from 1 to 12 carbon atoms, benzyl, α-methylbenzyl or α,α-dimethylbenzyl; and $R_3$ and $R_4$ are the same or different and each represents an alkyl group having from 1 to 20 carbon atoms or together form a cycloalkyl group having from 5 to 12 carbon atoms, and acid salts thereof.

2. A piperidine derivative as claimed in claim 1 wherein $R_3$ and $R_4$ are each a methyl group.

3. A piperidine derivative as claimed in claim 1 wherein X is the radical O, H, OH, NO or methyl; $R_1$ and $R_2$ are each alkyl groups containing from 1 to 12 carbon atoms, cyclohexyl or benzyl and $R_3$ and $R_4$ are each a methyl group.

4. A compound a claimed in claim 1 which is 4-diethoxyphosphinyl-4-hydroxy-2,2,6,6-tetramethyl piperidine.

5. A compound as claimed in claim 1 which is 4-diethoxyphosphinyl-4-hydroxy-2,2,6,6-tetramethyl piperidine-1-oxyl.

6. A compound as claimed in claim 1 which is 4-dicyclohexoxyphosphinyl-4-hydroxy-2,2,6,6-tetramethyl piperidine.

7. A compound as claimed in claim 1 which is 4-di-n-butoxyphosphinyl-4-hydroxy-2,2,6,6-tetramethyl piperidine-1-oxyl.

8. A compound as claimed in claim 1 which is 4-diethoxyphosphinyl-1,4-dihydroxy-2,2,6,6-tetramethyl piperidine.

* * * * *